D. S. COOK.
AGRICULTURAL IMPLEMENT.
APPLICATION FILED MAY 19, 1917.

Patented Mar. 18, 1919.

David S Cook
INVENTOR.

BY J. M. Thomas
ATTORNEY

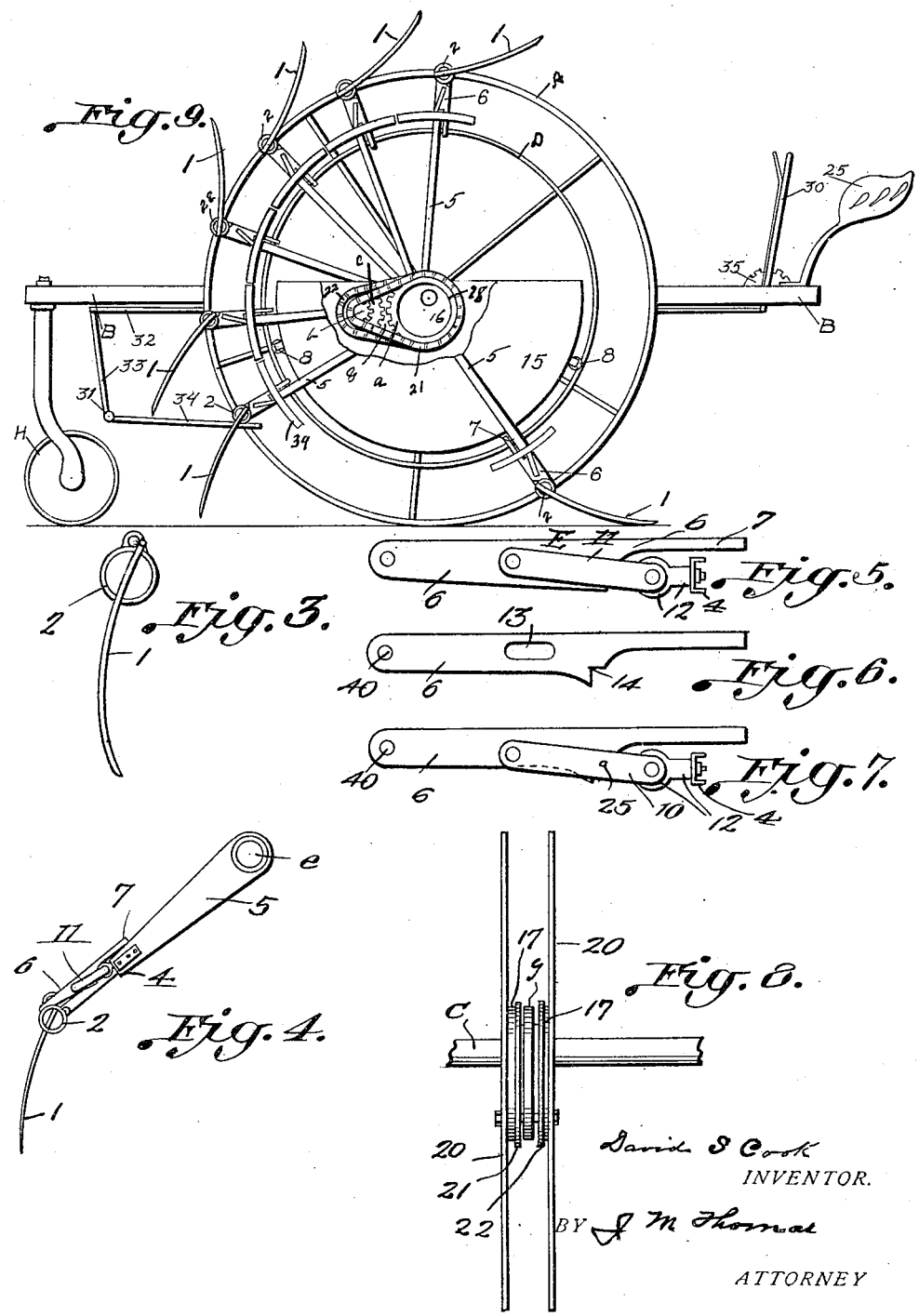

UNITED STATES PATENT OFFICE.

DAVID S. COOK, OF SALT LAKE CITY, UTAH.

AGRICULTURAL IMPLEMENT.

1,297,546.     Specification of Letters Patent.     Patented Mar. 18, 1919.

Application filed May 19, 1917. Serial No. 169,793.

*To all whom it may concern:*

Be it known that I, DAVID S. COOK, a citizen of the United States, residing at Salt Lake City, in the county of Salt Lake and State of Utah, have invented certain new and useful Improvements in Agricultural Implements, of which the following is a specification.

My invention relates to agricultural implements and has for its object to provide a mechanism whereby the curved tines of a plurality of digging forks are forced into the soil as the weight of the entire implement is applied by passing it over the individual forks as the implement is advanced. The tines of the forks contact with and enter the soil, and the handles of the forks act as levers and are pivoted on an axle. When the tines of each fork have engaged with and stirred the soil as the machine has been drawn over a strip of land the soil will be cultivated thoroughly in a manner similar to ground manually dug with a common digging fork.

These objects I accomplish with the machine illustrated in the accompanying drawings in which similar letters and numerals of reference indicate like parts throughout the several figures and as described in the specification forming a part of this application and pointed out in the appended claims.

Figure 1:
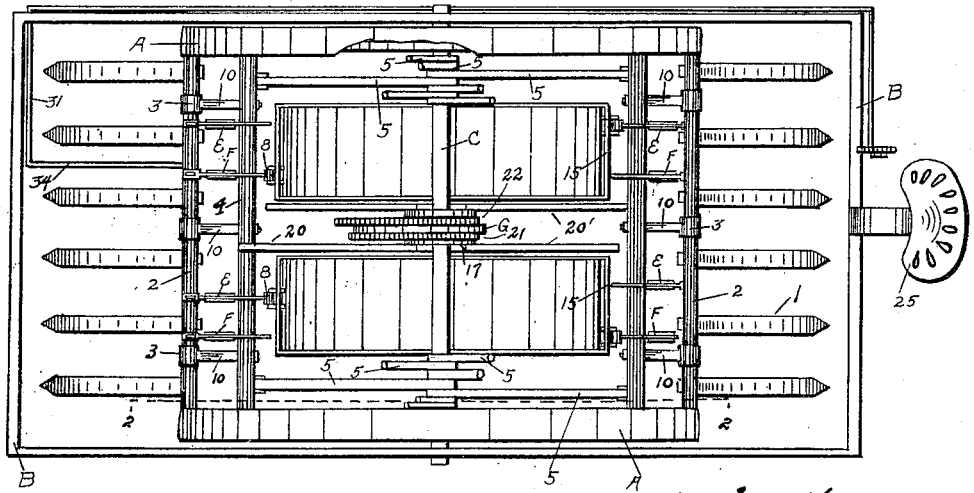
Figure 2:
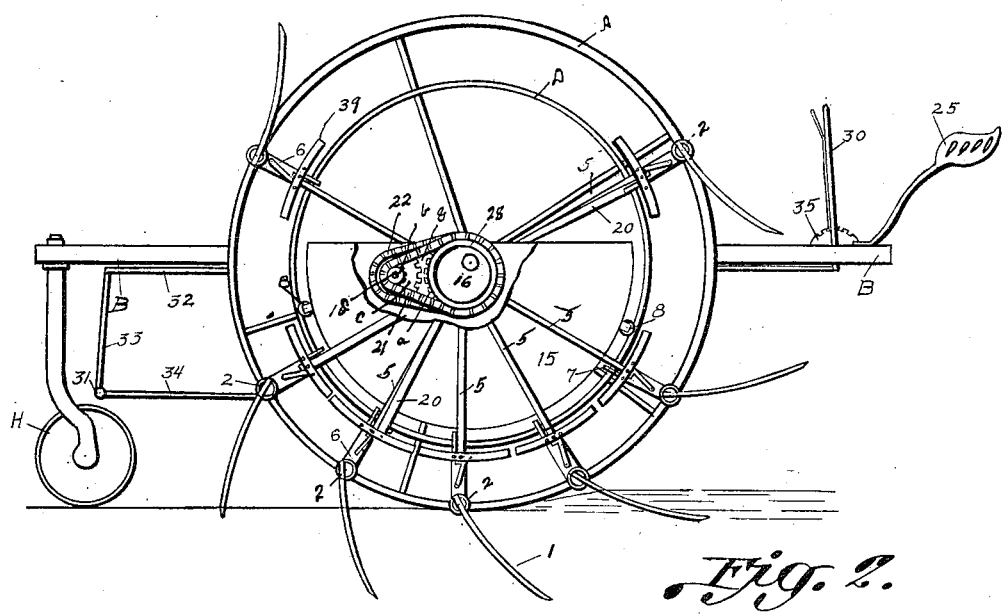

In the drawings in which I have shown a substantial embodiment of my invention, Figure 1 is a plan view of the machine, parts cut away. Fig. 2 is a side elevation with one of the carrying wheels removed on line 2 2 of Fig. 1. Fig. 3 is an elevation somewhat enlarged from the other figures of one of the fork tines, and with the end shown of the horizontal bar to which the forks are secured. Fig. 4 is a detail of one of the fork handles with the fork pivoted thereto through the horizontal bar. Fig. 5 is a side elevation of one of the fork handle locks. Fig. 6 is a side elevation of one of the release levers for releasing the lock of the fork handles. Fig. 7 is an elevation of one of the release levers of the fork locks. Fig. 8 is an elevation of the fork engaging arms and lock working mechanism shown on a short section of the axle of the machine. Fig. 9 is a vertical elevation with one wheel removed and showing the digging forks bunched in position for turning at the ends and traveling on the road.

The machine is mounted on wheels A in a rectangular frame B as supported by the non-rotatable axles C of the machine, and by the guide wheel H in front. The wheels A are positioned on the inside of said frame B and have on the inner side of each an internal bearing-flange D. Each fork consists of a plurality of curved tines 1 which are secured within a horizontal bar 2, preferably tubular in form. The said tubular bars 2 are each journaled in sleeve bearings 3, which bearings are formed on the outer end of the arms 10, which arms are secured on and carried by horizontally disposed U-bars 4. Each of said U-bars 4 is pivoted on the axle C of the machine by the radially disposed handles 5. The inner end of each of said handles 5 is pivoted on said axle. The end portions of each of said U-bars 4 bear on the said internal flanges D and are guided thereby. The fork handles consist of hingedly connected locking members 6, one end of which is pivotedly connected with said tubular bars 2 and a portion of each of said members 6 is cut away to form a tripping end, as at 7, against which a roller 8 engages in tripping the lock. When the tines of each fork have engaged with and passed through the soil and have been carried out of the soil, they are released by a trip hereafter explained and then by gravity the bar 2 partially rotates, thus allowing the fork to discharge the soil carried thereby and dropping the soil on the ground as a tilled or cultivated part thereof. The said rectangular frame B completely incloses the cylindrical orbit of the forks and handles. The inner ends of the arms 10 extend through the said U-bar 4, and are secured thereto by means of a shoulder and a nut on the end of the bar, as shown in Figs. 5 and 7. The U-bars 4 prevent side shifting of the fork body and relieve the weight and strain on the handles. From the U-bar 4 to the said bar 2 are provided a plurality of tripping link levers designated for purposes of description as primary and secondary and shown at E. and F. These lever-locks are designed to give the fork tines a rigid and desired position before they engage the soil, and they are locked by the primary locks at such position until the locks are tripped. The primary tripping lock levers E are pivoted at one end to the said U-bar 4, and at the other end to a projection on the upper side of the said bar 2. They are formed of the main lever 6, which is placed between two links 11, and pivoted thereto. An eye bolt 12 is fastened to the said U-bar 4 and the other end of said links are pivoted thereto. When the lever end 7 of the main levers 6 reaches a plane with the U-bars 4, the secondary levers fall into position and lock. They contact with the rollers 8 and lock the levers and give the teeth a desired tilt or position. The secondary trip levers F are constructed of levers, links and eye bolts similar to the primary levers. In the lever member 6 of the secondary lock lever F a slot 13 is medially provided which permits the lever member of each to move longitudinally, and allows the partial rotation of the bar 2 and tines when the primary locks E are tripped. The pivot pin connecting the two links 11 of the secondary locks is operated in the said slot 13, and when the handles are in advancing position this pin will be in the outer end of said slot, that is, in the end nearest the fork tines, and a notch 14 is cut in the said lever piece 6 in which a medially disposed pin 25 engages. The ends of said pin 25 are fastened in the said links 11. The trip rollers 8 are bolted at any desired point in the arc described by the levers, to a semi-circular casing 15. This semi-circular casing 15 is made of metal, and there are two in each of which soil or other matter can be carried to secure the necessary weight, if the frame and wheels of the machine are not sufficient. The fork advancing means is carried on the axle and consists of an elliptical or lanceolatedly shaped bearing disk G, to which two opposed eccentric cams 16 are adjustably secured on opposite faces and with openings therein through which the said axle is passed. The said cams 16 act as bearings for sprocket wheels $a$ and $d$, one on each of said cams. Annular bearing bands 17 having inwardly turned flanges 28 are also journaled on said cams 16. The said advancing arms 20 are bolted on the outside faces of said bearing bands 17 by means of which one of said bands is rotated around its cam disk 16, and by means of the sprocket chains and connected parts hereafter described the opposing arms 20 are rotated and carry the forks from the rear around and toward the front where they disengage by the eccentrical action of their rotation on the cam 16. The bearing band on one side is secured to the sprocket wheel $a$, and the opposed bearing band 17 is secured to the said sprocket wheel $d$. A shaft 18 is rigidly secured in the end portion of said bearing disk G farthest removed from said axle, and on the end that extends to the side on which is the said sprocket wheel $a$ is journaled the smaller sprocket wheel $b$, and on the other extended end of the same shaft 18 is secured the sprocket wheel $c$. A chain 21 incloses the sprockets $a$ and $b$, and a chain 22 incloses the sprockets $c$ and $d$. The arm 20 extending from one circular band 17 engages the U-bar 4 of one fork immediately after the tines have engaged in the ground and started under the machine, the arm disengaging when the U-bar 4 has passed under the machine. An arm on the other band 17 then engages the fork and carries it around and over the top of the machine whence it falls again into digging position at the front. The forks are circumferentially spaced as to each other before entering the soil to regulate the width of the section of soil cut by each. The spacing of one set of tines, or as herein called a fork, is accomplished by arc shaped parallel clasps 39, bolted with their backs together on the said arms 20 between the bars 2 and U-bars 4.

A hand lever 30, similar to that commonly used on agricultural implements to adjust their operations, is pivoted on the frame of the machine adjacent the seat 25, and said hand lever is connected by means of rod 32 with one arm 33 of a rocking bar 31 which is mounted at the front of the machine. The other arm 34 of said rocking bar 31 may be made to engage under and suspend the said bars 2 by manually moving said lever 30. The usual toothed rack 35 is provided to maintain the said lever and its connections in position when set. By means of said lever 31 and its connections the said bars 2 may be caught when desired and suspended and in that way preventing the tines of the forks from engaging with the soil and digging when turning at the ends or when moving the machine across the land.

The operation of my machine is as follows:—With power applied to draw the machine over the field, the said hand lever 30 is operated to release the forks by withdrawing the said arm 34 from under the supported bar 2 contiguous to said arm 34. This bar 2 will fall of its own weight and with the tines of the fork rigidly set to be pressed by the weight of the passing machine into the soil as the machine is drawn over the tines so engaged in the soil. The forks consist of the tines, the horizontal bar 2 in which they are secured, the parallel channel iron or U-bar 4 with the handles connecting the said bars, the additional arms 10, and the radial handles 5 which are pivoted on and rotate around the axle C.

To set the tines in their digging position and trip them after they have tilled a section of the soil, lever members are provided, consisting of two primary trip levers and two adjacent secondary trip levers. When the primary levers have tripped at the rear of the machine, the fork with its connections will be carried in an orbit around and over to the front of the machine, at which time and place the secondary levers are tripped and the raising of the portion 7 of the secondary trip levers 6 disconnects the pins 25 from their engagement in the said notches 14, which allows the secondary levers to shorten and the pivot pin in the end of the links 11 to slide in the slot 13 therein. The weight of the free ends of the tines and of the primary levers when the said fork is descending in its orbit at the front of the machine will partially rotate the said bar 2 and bring the tines into the digging position. At the same time, and by the rotation of the said bar 2 the primary levers will have been drawn out and the members 6 will fall to about the plane of the handle, and they will remain in that position while digging and until tripped at the rear by the portion 7 engaging the roller 8. The secondary levers F hold the tines in the disengaged position from the time they and the bar 2 in which they are secured are partially rotated by gravity at the rear of the machine when the primary lever is tripped. When the tripping of the primary lever E occurs at the rear it practically shortens and the secondary lever lengthens, and the engagement of the said pin 25 within the notch 14 in the secondary lever occurs; this action locks the tines in the disengaged position and holds them in that position until the secondary lever is tripped at the front of the machine.

Such of the forks as are drawn forward are carried and held by their respective arms and the weight of the machine and are carried while out of operation on the wheels. When the arms are released the operation of forks is released.

Having thus described my invention, I desire to secure by Letters Patent and claim:—

1. An agricultural implement comprising a wheel supported frame; an axle in said wheels; a plurality of pairs of fork handles pivoted on said axle; a bar connecting each pair of said handles; a plurality of tines carried in bars parallel with and carried by the bars first mentioned; and means to hold said tines in a rigid position while they are forced into the soil by the weight of the implement as it is drawn over the tines while in the soil.

2. An agricultural implement comprising a wheel supported axle; a plurality of fork handles pivoted on said axle in pairs; a bar connecting each pair of handles; another bar parallel thereto and connected therewith; a plurality of tines fastened in the last described bar; means to rotate the said forks partially around said axle, and means to hold said forks rigidly in digging position while the said axle is drawn forward and the tines of the forks are moved by their handles as levers.

3. An agricultural implement comprising a wheel supported axle; a plurality of fork handles pivoted thereon; a transverse bar connecting the said handles in pairs; another bar parallel thereto; a plurality of curved tines secured in one of said bars; and means to move said bars and their connections in an orbit around the axle from the rear of the machine to the front.

4. An agricultural implement comprising a wheel supported axle; a plurality of fork handles pivoted thereon; transverse bars one of which connects the said handles in pairs; a plurality of curved tines secured in one of said bars; and means to move said bars and their connections in an orbit around the axle from the rear of the machine to the front, said means consisting of arms which are engaged by the bar that connects the fork handles.

5. An agricultural implement comprising a wheel supported axle; a plurality of fork handles pivoted thereon; transverse bars one of which connects the said handles; a plurality of curved tines secured in one of said bars; means to move said bars and their connections in an orbit around the axle, said means consisting of radially disposed arms adapted to be engaged by one of said bars; eccentric cams on which said arms are mounted to move said arms longitudinally; and sprocket wheels and chains to impart motion to said arms.

In testimony whereof I have affixed my signature in presence of a witness.

DAVID S. COOK.

Witness:
SAM RANEY.